July 30, 1968  F. KALWAITES  3,395,201
METHOD AND APPARATUS FOR PRODUCING AN ABSORBENT PRODUCT
Filed July 14, 1964  3 Sheets-Sheet 1
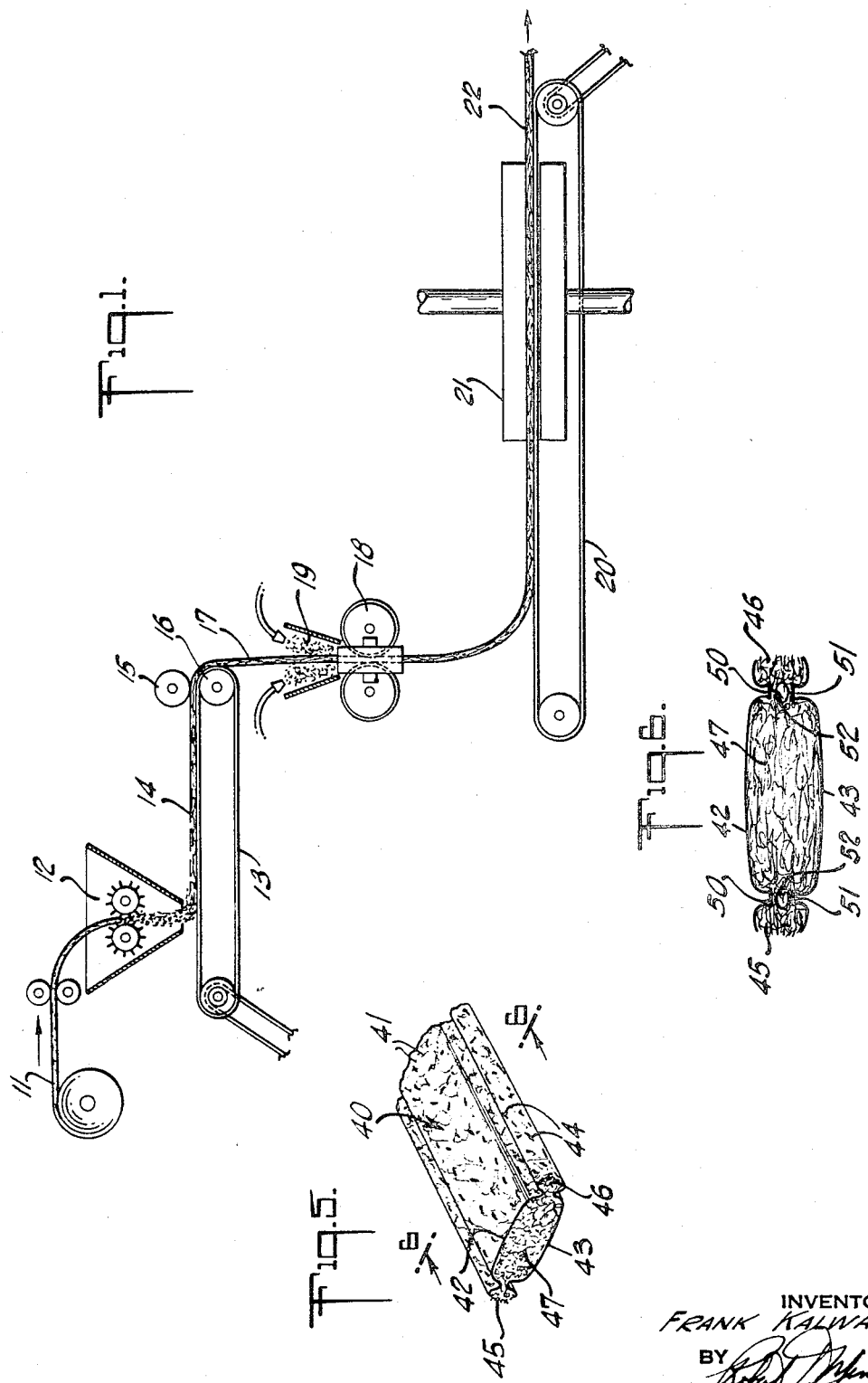
INVENTOR
FRANK KALWAITES
BY
ATTORNEY

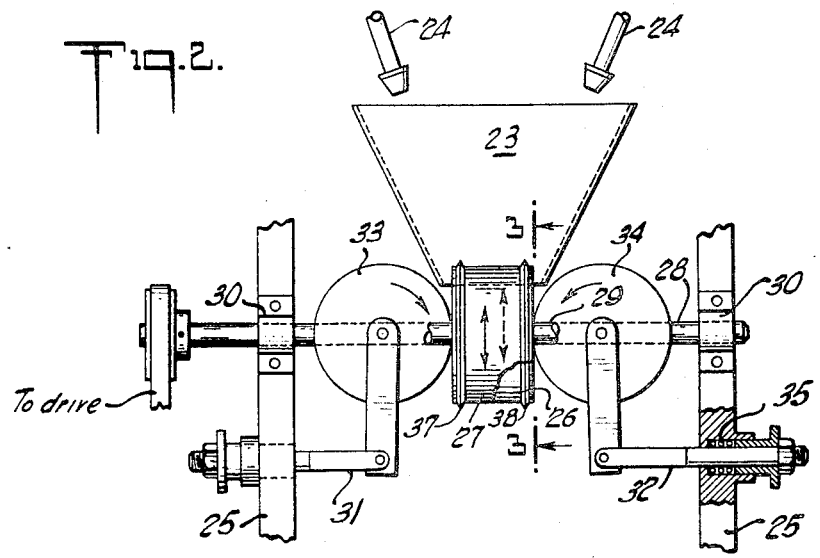
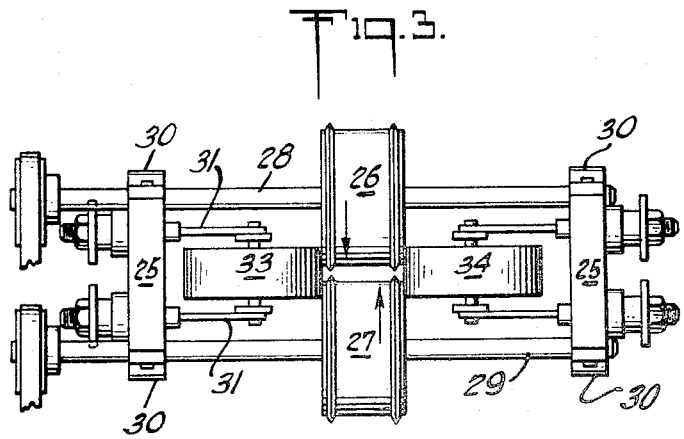
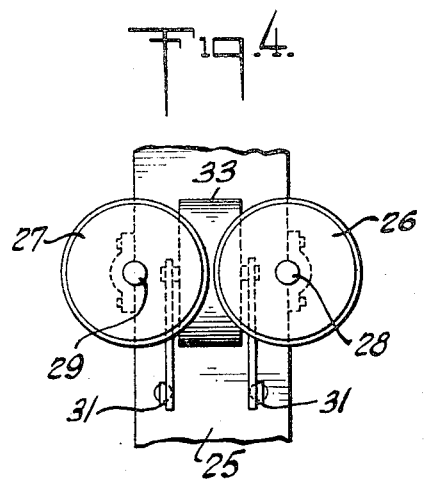

United States Patent Office 3,395,201
Patented July 30, 1968

3,395,201
METHOD AND APPARATUS FOR PRODUCING
AN ABSORBENT PRODUCT
Frank Kalwaites, Somerville, N.J., assignor to Johnson &
Johnson, a corporation of New Jersey
Filed July 14, 1964, Ser. No. 382,516
12 Claims. (Cl. 264—45)

ABSTRACT OF THE DISCLOSURE

Method and apparatus for producing handleable, absorbent assemblages of fibrous material from fluffy batts of fibers which are incapable of being handled without fiber separation. The method comprises applying foam bonding materials of gases and liquids to the entire surface of the batt, substantially immediately confining the entire surface of the batt to press the binder into the surface but not to the intermediate portion of the batt, and drying the bonding material to form the assemblage. The apparatus comprises a device for applying a coating to the surfaces of a batt and rotatable rolls for contacting all surfaces of the batt and means for feeding foamed bonding material to the surfaces of the batt while the batt is advancing through the rotatable rolls.

---

The present invention relates to novel methods and apparatus for manufacturing absorbent products. More particularly, this invention relates to new methods and apparatus for applying small amounts of bonding materials to absorbent fibrous structures and to the self-sustaining, relatively strong, handleable absorbent products produced.

A major absorbent material used in the manufacture of products such as sanitary napkins, disposable diapers, dressings, and the like is an assemblage of short fibers, such as batts or layers of comminuted wood pulp, cotton linters, or other noncardable short fibers. These noncardable short fiber assemblages are fluffy and flimsy, have good absorption qualities, are usually of low cost and are readily available. A major disadvantage of such noncardable short fiber assemblages is that the short fibers readily separate from the general assemblage. This problem is commonly known in the industry as "dusting" or "linting." Furthermore, the assemblages have little strength and poor cohesive stability making them difficult to handle and process and virtually impossible to use without the incorporation or addition of other components. For example, the short fiber assemblages may have incorporated therein a gauze or paper reinforcing layer or the assemblage may be wrapped in a casing or cover of paper, gauze, nonwoven fabric, or the like. The added components, though increasing strength, have the disadvantages of increasing the cost of the final absorbent product and also in changing some of the favorable properties of the short fiber assemblage, such as absorption and hand.

In copending application of Harmon, Ser. No. 333,087, filed Dec. 24, 1963, and now abandoned, there is described an absorbent product which is self-sustaining, relatively strong, and handleable, and which does not require added components, such as gauze or paper, etc. This product is a stable, unitary, noncardable short-fiber assemblage comprising a fluffy batt of randomly arranged, intermingled and mechanically interengaged, noncardable short fibers. The surface layer of fibers of the batt are adhesively bonded together to form a relatively strong skin on the surface of the batt. The interior portion of the batt remains in a fluffy and flimsy state. Some of the fibers which lie in the general plane of the skin have unbonded portions which extend out of the plane of the sheet and entwine and entangle with the fibers of the interior portion of the batt and stabilize the entire batt and produce a unitary, stable assemblage of short fibers.

Though this product has gained considerable acceptance, very often the edges of the assemblage are not well-stabilized or bonded and in many end uses where stress or compression is placed along the width of the assemblage the edges will not withstand this force and will split or tear along these longitudinal edges. This facility for tearing is more prevalent the thicker the assemblage.

In accordance with the present invention I have developed a method and apparatus for producing a stable, unitary, noncardable short fiber assemblage comprising a fluffy batt of randomly arranged, intermingled and mechanically interengaged noncardable short fibers having densified and stabilized longitudinal edge portions. The surface layers of fibers on opposite surfaces of the assemblage are bonded to form a relatively strong skin on these surfaces. The interior portion of the assemblage remains in a fluffy and flimsy state. Some of the fibers which lie in the general plane of the skin have unbonded portions which extend out of the plane of the skin and entwine and entangle with the fibers of the interior portion to stabilize the entire assemblage. The longitudinal edge portions of the assemblage are bonded and the fiber density increased so that the longitudinal edge portions are stabilized, have excellent strength and will not allow the short fibers to sift through the edges of the assemblage.

Separating each longitudinal edge portion from the major portion of the assemblage is a barrier area. The barrier area comprises a pair of highly compressed areas of narrow width substantially parallel to the longitudinal edge of the assemblage with the highly compressed areas separated by an area of low fiber density. The barrier areas restrict the flow of fluids to the longitudinal edge portions of the assemblage and reduce possible leakage of absorbed fluids from the edges of the batt.

In accordance with the present invention measured amounts of a foamed bonding material are applied to the entire surface of the batt. The batt is then confined to press the foam bonding material into the entire surface of the batt but not to the intermediate portion thereof. The batt containing the foam bonding material in its surface layer is dried while the bonding material is in the surface to form the product of the present invention.

In carrying out the method of my invention the starting elongated fibrous batt is passed through a device comprising a pair of rotatable rolls having parallel axes disposed in a given plane and spaced apart to accommodate the batt. The cylindrical surfaces of these rolls are adapted to engage one pair of opposed surfaces of the elongated batt. A second pair of rotatable rolls having parallel axes disposed in the same given plane as the first pair of rotatable rolls are spaced apart to accommodate the batt and engage the other pair of opposed surfaces of the elongated batt. The cylindrical surfaces of one pair of the rolls has a width so as to enable the rolls on rotation to pass between the surfaces of the other pair of rolls and to substantially span the distance between the cylindrical surfaces of the other pair of rolls so as to form an opening in the given plane. This opening is defined by the cylindrical surfaces of the rolls. All of the rolls are rotated in a direction such that the surfaces of the rolls at the opening are all moving in the same direction. The elongated batt is passed in this direction through the opening so that the surfaces of the batt are engaged by all of the rolls as the batt is advanced through the opening. Foamed bonding material is fed to all of the surfaces of the batt as the batt is being passed through the aforesaid opening whereby bonding material is applied to the entire surface of the moving batt but not to the intermediate portion thereof.

The elongated fibrous batt has a generally rectangular cross section and in my preferred apparatus the pair of rolls contacting the larger surfaces of the batt have raised ridges about the circumference of the rolls adjacent the ends of the rolls. These ridges are so positioned as to contact the batt as it is passing through the opening adjacent the longitudinal edges of the batt. These ridges in combination with the opposite set of rolls form a compression area along both longitudinal edge portions of the batt and compress and densify these longitudinal edge portions of the batt while simultaneously pressing the foamed bonding material into the longitudinal edge portions of the batt whereby these portions are stabilized.

That portion of the batt which passes between the ridges on opposed rolls is highly compressed. When this compression is released the opposite surfaces in the compressed areas separate to produce an area of low fiber density between the highly compressed surfaces and form the barrier area adjacent the longitudinal edge portions of the batt.

The absorbent products of the present invention have cohesive stability, good absorption characteristics and do not dust or lint. Fibers do not pick or pill from any of the surfaces of the stable fiber assembly and all surfaces are resistant to abrasion especially the longitudinal edge portions.

The absorbent products of the present invention are self-sustaining and may be used by themselves or in combination with other materials such as waterproof paper, plastic films, and the like. If desired, the stable assemblage of the present invention may be wrapped in gauze, nonwoven fabric, or similar materials, for use in areas where considerable strength is required or to improve the adaptability of the product to the body. For example, sanitary napkins generally have an absorbent bulky center section with pinning tabs extending beyond the ends of the absorbent material for holding the absorbent material when in use. A simple and economical sanitary napkin could readily be formed by wrapping an absorbent product of the present invention having the desired size and shape in a piece of gauze fabric which extends beyond the ends of absorbent material to form the pinning tabs of the sanitary napkin.

In forming the absorbent products of the present invention the bonding material is applied in the form of a foam which is laid on the fiber surface. The foam is light and does not compress the batt. The foam is pressed into the surface layer of fibers without substantially soaking the fibers and the foam does not disrupt the general fiber arrangement in the batt.

The starting materials used may comprise an elongated batt or sheet of noncardable short fibers, such as wood pulp, cotton linters, jute, linen, hemp, manila, bamboo, eucalyptus, bagasse, straw, esparte, etc. Any of the various types of wood pulps may be used, such as mechanical wood pulp, chemical wood pulp, semichemical wood pulp, reclaimed paper pulps, etc. The pulp may be manufactured from any of the various coniferous or deciduous trees, such as hardwood, hemlock, fir, pine, gum poplar, and the like. The cellulosic fibers are preferred because they are inexpensive, readily available, and highly absorbent. Other noncardable short fibers or blends of fibers may be used, such as wool, nylon, cellulose acetate, viscose rayon, and the like. Noncardable short fibers have a length of less than about ¼ inch. The fiber length may vary downwardly from ¼ inch to a few hundredths of a millimeter or less. For example, some of the more common wood pulps contain fibers ranging in length from about 0.5 mm. to 6 mm. with most of the fibers in the wood pulp having a length of from about 1 mm. to 3 mm.

Virtually any of the known adhesive bonding materials which are foamable may be used to bond the fibrous batt. Suitable bonding materials are the acrylic resins, such as the polymers, the copolymers of the lower alkyl esters of acrylic acid, for example ethyl acrylate, and the like; the formaldehyde condensation products, such as urea formaldehyde, melamine formaldehyde, phenol formaldehyde, and the like; the vinyl resins, such as vinyl acetate, vinyl chloride and the like; the polyolefins, such as polyethylene, polypropylene, polyisobutylene, and the like; the styrene resins; the polyurethane resins; the synthetic and natural rubbers; the cellulosic materials, such as viscose, hydroxyethylcellulose, and the like; the starches; the natural glues, such as gum arabic, stractam, and the like; etc.

The adhesive bonding materials used in accordance with the present invention are dispersions or solutions of the above-mentioned polymers, copolymers and other chemicals. The dispersions used are generally aqueous and the solutions may be aqueous or nonaqueous. Aqueous mediums are preferred because of their ease of handling, nontoxic nature, etc.

The solutions and dispersions are foamed by adding surfactants or wetting agents which lower the surface tension of the liquid and then introducing air or other gas under the surface of the liquid mass, for example, by agitating the surface of the liquid so that the liquid encases the air and forms a foam.

Suitable surfactants are the alkyl aromatic sulfonates, fatty alkyl sulfates, sulfated oils, sulfated esters, petroleum sulfonates, carboxylic acid soaps, quaternary ammonium compounds, amine salts, and the like. Specific surfactants suitable for producing foam are dodecyl benzene sulfonate, sodium stearyl sulfopropionate, lauryl alcohol sulfonate, monostearylethylenediamine, trimethyl ammonium methyl sulfate, etc. The amount of surfactant used may be varied over relatively wide limits of from about 0.1% to about 5% based on the weight of the resin, though it is preferred that from about .5% to 2½% of surfactant be used in producing the foamed resin.

It is important that the foam bonding material to be applied to the fiber base be fresh and not allowed to stand. If the foam bonding material is allowed to stand for a long period of time the foam cells break and the foam starts to separate producing areas of increased wetness rather than a uniform foam. Such nonuniform foams are tacky and difficult to apply to the short fibers. If the foam is too wet the fibers become saturated with water and the fibers will then become compressed and densified in the wet areas.

The wetness of the foam will depend to a large extent on the amount of bonding material solids in the liquid to be foamed, the type and amount of surfactant used, the ratio of air or other gas to liquid, foam cell size, etc. For example, a foam made from a liquid with high resin solids content using an air to liquid ratio of about 20 to 1 produces a very fine cell size and a dry foam which only slightly penetrates the fibrous batt, whereas a low resin solids content liquid foamed with 5 parts of air per part of liquid produces a wet foam with a cell size of about ⅛ inch. Foams made from liquids having a solids content of about 5% with an air to liquid ratio of 10 to 1 have been found suitable for use in accordance with the present invention.

It is preferred that the foam bonding material have a foam cell size of less than ⅛ inch diameter and preferably less than 1/16 inch diameter. Foams having cell size of 1/40 of an inch down to 1/100 of an inch diameter have been found suitable for use in accordance with the present invention. The fine cell foams are relatively stable and more easily controlled both as to uniformity of foam and sharpness of the pattern in which they are applied to the short fiber batt.

In accordance with the present invention measured amounts of foam are applied to the entire surface of the elongated batt, that is, to both the upper and lower surfaces and the two longitudinal edge surfaces of the batt. The batt with the foam on the surface is confined over its entire surface and the foam penetrates the entire surface layer of fibers and remains in this surface rather than spreading to the intermediate portion of the batt. The foam cells break while in the fibrous surface to form a skin of bonded fibers over the entire surface. The skin comprises a network of noncardable short fibers, held together by binder with unbonded portions of fiber extending into the interior portion of the batt to stabilize the entire batt. Nonuniform foams or foams which are too wet do not remain on the surface of the fiber assembly but penetrate the fiber assembly by saturating individual fibers which not only increases the fiber density of the assembly but also forms a sticky, tacky mass which will adhere to the confining means.

It is preferred that when the foam is applied and the entire surface of the batt confined that the longitudinal edge portions be simultaneously compressed, to densify and stabilize the longitudinal edge portions to prevent these edges from splitting or tearing during subsequent use.

The amount of adhesive bonding agent required to stabilize the fiber batt is small and allows the batt to maintain its porosity and absorptive characteristics, yet imparts cohesive stability to the mass of fibers to the degree necessary to allow the mass to be further processed and in many instances to be used as an absorbent product without incorporating additional strengthening means.

Generally, the amount of bonding material will be less than about 10% based on the weight of the final product and preferably less than about 5% of bonding material is used. In some instances the amount of bonding material may be reduced as low as a fraction of a percent based on the weight of the final product.

After the bonding material is applied the assemblage is dried. The assemblage may be dried in air, at atmosphere temperature if desired. The temperature may be elevated from about 212° F. to about 450° F. or more, for periods of time of from a few seconds to 5 minutes or more to accelerate the drying time. If high temperatures of 400° F. or more are used in the drying operation the times must be short to avoid discoloration of the wood pulp or other fibrous material. In those instances when a self cross-linking resin is used as the bonding material or if a cross-linking agent is added to the bonding material the drying step is also a curing step for the cross-linking reaction and generally elevated temperatures will be required.

The starting batts of noncardable short fibers have a thickness of from about $\frac{1}{16}$ inch to a couple of inches or more. The starting batt is lightly compressed to press down loose surface fibers prior to foam bonding material being applied to the surface and the entire surface is lightly compressed and confined a second time after the foam bonding material is applied. The density of the starting batt will vary from about 0.05 gram/cc. to about 0.07 gram/cc. or more. The thickness of the final products will vary to the same extent as the starting batts, i.e., from about $\frac{1}{16}$ inch to a couple of inches or more, and preferably from about $\frac{3}{32}$ inch to 1 inch. The specific thickness of each product will depend to a large extent on its proposed end use. For example, when used as a diaper, thicknesses of from about $\frac{1}{8}$ inch to $\frac{3}{16}$ inch have been found suitable, while when used as a sanitary napkin thicknesses of from about $\frac{1}{4}$ inch to $\frac{1}{2}$ inch have been found suitable.

The noncardable short fiber batts while having good fluid absorption properties have relatively poor fluid distribution properties, i.e., fluid absorbed is transmitted equally through the batt and along the batt, hence full utilization of the absorbent capacity of the entire batt is not realized. Fluid distribution along a batt may be improved by placing in the batt densified areas or compacted areas which have much greater fluid capillarity than the uncompacted areas. If these compacted areas are patterned correctly substantially the entire batt may absorb fluids before the fluids pass through the batt. Furthermore the compacted areas improve the overall flexibility and conformability of the batt and if positioned correctly allow the batt to be rolled up on itself.

At times it may be desirable to increase the abrasion resistance and/or strength of the absorbent product of the present invention. This may be done by incorporating textile fibers, continuous filaments or other long fibers either in the batt of noncardable short fibers or on one or more surfaces of the batt of noncardable short fibers.

After foam bonding material has been applied to the starting material in accordance with the present invention and allowed to dry the skin formed on the upper and lower surfaces of the final product may vary in thickness from a fraction of a percent of the total thickness of the product to about 25% of the total thickness, and preferably from about 1% to 10% of the total thickness of the product. Generally, these skins have a thickness of from about 0.001 inch to about $\frac{3}{8}$ inch, preferably from about 0.01 inch to about $\frac{1}{16}$ inch. The skin thickness of an assemblage is not uniform over the entire surface but will vary from area to area. However, the skin is relatively strong and produces a non-linting or non-dusting surface. The stable assemblage is flexible and may be flexed to a considerable degree without breaking the skin of fibers and bonding material, that is, the skin is strong enough so that when the assemblage is flexed the unbonded fibers are compacted rather than the skin breaking. The skin though paper-like in thickness is devoid of hydration bonds and therefore is soft and noiseless, and does not have the customary rattle of paper. The longitudinal edge portions of the product also have a skin of binder and fibers; this skin is generally thicker and not as well-defined. Fiber density is greater along these longitudinal edge portions than in the major portion of the assemblage due to the compression of these edge portions.

The invention will be further described in conjunction with the accompanying drawings wherein:

FIGURE 1 is a diagrammatic showing in elevation of a method of applying foam bonding materials to elongated fibrous batts in accordance with the present invention.

FIG. 2 is a front view of preferred apparatus for producing products according to the invention, portions being omitted for the sake of clarity.

FIG. 3 is a top view of the apparatus of FIG. 2 with portions removed for purposes of clarity.

FIG. 4 is a side view of the apparatus of FIG. 2 with portions removed for purposes of clarity.

FIG. 5 is a perspective view of a stable fiber assemblage which is overall bonded on its upper and lower surfaces and has its longitudinal edge portions compressed and stabilized.

FIG. 6 is an enlarged cross-sectional view taken along line 6—6 of FIG. 5.

FIG. 7 is a photomicrograph of a cross-section of the longitudinal edge portion and barrier area of an absorbent product produced according to one embodiment of the present invention at an original enlargement of approximately 20 to 1.

Referring to the drawings, FIG. 1 illustrates a method of carrying out the present invention on a continuous basis. Wood pulp board 11 is fed to a hammer mill 12 to grind the board and deposit the loose, fluffy wood pulp fiber on an endless conveyor 13. The loose fiber batt 14 or pulp ribbon as it is commonly called in this stage is passed between a pair of compression rolls 15 and 16 to produce a wood pulp batt 17. The compression rolls lightly compress the batt and if desired may compress the batt both on its upper and lower surfaces and along its longitudinal edges. If desired, these rolls may be patterned to lightly compress the batt and highly compress the batt heavily in a pattern of areas to improve fluid capillarity of the final product as previously described.

The lightly compressed batt is then passed through the opening formed by four rotatable rolls 18. Two rolls contact opposite surfaces of the batt while two rolls contact the longitudinal edges of the batt. The rolls rotate at their point of contact with the batt in the same direction and at the same speed as the batt is moving. Foam bonding material 19 is applied to the entire surface of the batt and as the batt passes through the opening formed by the previously mentioned rolls foam is pressed into the surface of the batt and along the longitudinal edges of the batt by the foam applying means. The foam coated, elongated batt is placed on a second endless conveyor 20 and is dried by passing it through an infrared drying oven 21 or other suitable drying means to produce the stable fiber assemblage 22 of the present invention.

In FIGS. 2, 3 and 4 there is illustrated a foam applying means comprising four rotatable rolls forming a rectangular opening through which an elongated fibrous batt may be passed. Foam is applied to the surface of the batt prior to the batt being passed through this opening by feeding foam bonding material to a square sided funnel 23 through the nozzles 24. If desired, four nozzles may be used to apply foam to all four sides of the funnel.

The batt is passed through the funnel and foam deposited on the batt surfaces. The foam-coated batt then passes through the opening of the foam applying means. The foam applying means comprises a frame 25 in which there are mounted a pair or rotatable rolls 26 and 27 on shafts 28 and 29 supported for rotation on bushings 30 mounted in the frame. These rolls have their axes in the same plane and the rolls are driven in opposite directions by standard methods not depicted for the sake of clarity. Mounted for rotation on angle brackets 31 and 32 bolted to the frame are two rotatable rolls 33 and 34. The rolls 33 and 34 are mounted in one leg of the angle brackets and this leg is pinned for movement to the other leg of the angle bracket. The brackets 31 and 32 are spring loaded 35 in the frame so that the rolls 33 and 34 contact the first pair of rotatable rolls 26 and 27 and are functionally driven thereby so that all roll surfaces are moving in the same direction at the opening 36. At the outer edges of the first pair of rotatable rolls and about the circumference of these rolls are raised ridges 37 and 38. As the elongated fibrous batt with the foam bonding material on its entire surface passes through the opening 36 the bonding material is lightly pressed into the surface of the batts by the surfaces of rolls 26 and 27 between the ridges 37 and 38. The foam bonding material is also pressed into the longitudinal edge portion of the batt and the entire longitudinal edge portions of the batt compressed and stabilized by the area encompassed by the ridges on rolls 26 and 27 and the surfaces of rolls 33 and 34.

The operation of this device is such that when an elongated fibrous batt with foam bonding material applied to its entire surface is passed through the opening 36, the broad widthwise surfaces are lightly compressed and foam bonding material pressed into these surfaces while simultaneously the longitudinal edge portions of the batt are densified and foam bonding material pressed into these longitudinal edge portions.

In FIGS. 5 and 6 there is shown a stabilized elongated fibrous assemblage 40 produced in accordance with the present invention. The assemblage comprises an elongated mass of short fibers 41. On the upper and lower surfaces of the assemblage there are skins 42 and 43 formed from bonding material 44 and short fibers. The longitudinal edge portions 45 and 46 of the assemblage have been compressed and densified and bonding material distributed on these longitudinal edge portions to stabilize them. These edge portions are stabilized to even a greater degree than the upper or lower surfaces. The interior portion 47 of the batt is free of adhesive bonding material.

Between the longitudinal edge portions 45 and 46 and the major or center portion of the assemblage, there are barrier areas 48 and 49. The barrier areas comprise a pair of highly compressed surfaces 50 and 51 separated by an area of low fiber density 52.

If desired, a water repellent, such as a silicone or a wax material may be included with the foamed bonding material applied to the longitudinal edge portions to make these edges water repellent. Furthermore, the water repellent may also be applied to one surface of the batt so that on surface and both longitudinal edge portions of the batt are water repellent leaving only one absorbent surface.

FIG. 7 is a photomicrograph of a cross-section of a portion of a product of the present invention. The assemblage 55 contains noncardable short fibers 56 held together by a bonding material 57 distributed over both surfaces of this fiber assemblage and throughout the longitudinal edges of the assemblage.

The bonding material extends through the surface layer of fibers to form a skin 58 on the surfaces of the assemblage but does not extend through the entire thickness of the fiber assemblage. The major portion 59 of the assemblage, that is, the interior portion comprises unbonded short fibers encompassed by skin on its upper and lower surfaces and bonded stabilized areas along its edges. Unbonded portions of fibers extend from the skin into the assemblage and are in frictional engagement and mechanical entanglement with the fibers in the interior portion of the assemblage whereby the entire assemblage is stabilized. Separating the longitudinal edge portion from the major portion of the assemblage is barrier area 60. The barrier area comprises a pair of highly compressed surfaces 61 and 62 separated by an area of low fiber density 63.

Even though the binder is applied over the entire surface the binder is not continuous and does not form a film on the surface. The binder is discontinuous and binds fibers primarily at their intersections and in some instances may even bridge fibers.

In carrying the invention into practice, the foam bonding material is applied to the entire surface of the elongated batt immediatedly before the batt is passed to the opening of the foam applying means. This is more clearly depicted in FIG. 1.

One method of applying this foam bonding material is to present a funnel with the narrow end of this funnel directed towards the opening in the foam applying means. Foam bonding material is then continuously fed to the funnel and is pressed into the elongated batt by the surfaces of the rotating rolls. In practice different types of foam bonding material may be applied to different areas of the funnel so that a different foam bonding material contacts each of the surfaces of the rotating rolls. In this manner, the surfaces of the resultant product may have various properties such as some surfaces being extremely soft while others are relatively stiff or some surfaces being repellent while others are absorbent, etc.

The invention will be further illustrated in greater detail by the following specific examples. The percentages are by weight unless otherwise indicated.

EXAMPLE 1

A hardwood wood pulp in the form of a highly pressed pulpboard about 5 inches wide, 1/8 inch thick is ground in a hammer mill to form a pulp ribbon of fluffy loose fibers. The pulp ribbon is 6 inches wide and is about 1/4 inch thick and weighs about 24 grams per square foot. The ribbon is passed between compression rolls and lightly compressed.

Liquid bonding material having a composition of 5% polyvinyl chloride polymer, 2% of an alkyl sulfoamide, sold under the trade name Igepon by the General Aniline Film Corportion with the remainder water is foamed with air at a ratio of about 10 parts of air per part of liquid. The foam has an average cell size of about 1/80 of an inch in diameter. This foam is fed to a funnel through which the elongated fibrous batt passes and foam bonding material applied to the entire surface of the batt. The batt with the foam bonding material on its surface is passed through the opening formed by the rolls as illustrated in FIG. 1. Foam bonding material is pressed into the upper and lower surfaces of the batt and the longitudinal edge portions of the batt compressed and densified.

The amount of bonding material applied is about 0.3 gram per square foot of surface.

The batt with the bonding material thereon is passed through an infrared oven at a temperature of 220° F. The elevated temperature drives off the water and dries the assemblage.

The stabilized assemblage has considerable cohesive strength, good strength along its longitudinal edges, substantially no fiber separation, is self-sustaining, highly absorbent and has a very soft hand. It is suitable for use as an absorbent dressing or absorbent underpad.

EXAMPLE 2

Pine wood pulp in the form of a highly compressed pulpboard about 5 inches wide and 1/10 inch thick is ground in a hammer mill to form a pulp ribbon of fluffy loose fibers. The ribbon is approximately 2¾ inches wide and about ¾ inch thick and weighs about 45 grams per square foot. The ribbon is lightly compressed. The ribbon is passed through a funnel and into a rectangular opening formed by four rotatable rolls. The axes of all rolls are in the same plane and two opposed rolls contact the widthwise surface or the 2¾ inch surface of the batt while two opposite opposed rolls contact the lateral edges or ¾ inch surfaces of the batt. The rolls contacting the 2¾ inch surfaces have ridges along their outer extremities and about the circumference of these rolls and compress the batt adjacent its longitudinal edges. At the point of contact of all four rolls with the batt the rolls are moving in the same direction and at the same speed both with respect to each other and the batt. The funnel through which the elongated batt passes has a section corresponding in area to one widthwise surface or 2¾ inch surface of the batt. This section is partitioned off with sheet metal partitions which extend from a point in close adjacency to the batt surface to the funnel surface, and extend down almost to the rectangular opening formed by the rolls.

To this section there is fed a foamed bonding material comprising a polyvinyl acetate interpolymer resin emulsion. The polyvinyl acetate polymer is a copolymer of ethyl acrylate, vinyl acetate, methylacrylamide and acrylamide. This polymer is highly plasticized with a plasticizer sold by the Monsanto Chemical Company under the trade name Santicizer 160. The liquid portion of the foam bonding material comprises 10% by weight of the polyvinyl acetate interpolymer and plasticizer and approximately 1% of a polyether alcohol surface acting agent sold under the trade name Triton X–100 with the remainder water. The liquid is foamed with 7 volumes of air per volume of liquid so that the foam has a density of approximately 0.15 gram/cc. To the remaining portion of the funnel there is fed a foam bonding material the liquid portion of which comprises 10% by weight of an acrylic polymer of ethyl acrylate, methylol acrylamide and acrylamide, 3% by weight of a melamine wax formaldehyde derivative water repellent sold under the trade name Phobtex f/x/c, 1% by weight of a polyetheralcohol surface acting agent sold under the trade name Triton X–100, 0.5% of ammonium chloride catalyst to aid in the crosslinking of the acrylate polymer and the remainder water.

This foam bonding material is applied to the opposite 2¾ inch surface and along the longitudinal edge portions of the elongated fibrous batt. The total amount of binder applied is approximately 4.7% by weight of the pad.

The pulp ribbon with the bonding material thereon is passed through an infrared oven at a temperature of about 450° F. The time in the oven is about 30 seconds and the fibrous batt has the water driven off and the bonding material cured and dried.

The original pulp ribbon is not self-sustaining but falls apart and fibers readily dust from the ribbon. However, when bonded as described above, the final assemblage has considerable cohesive strength and substantially no fiber separation. The longitudinal edge portions of the batt are well-stabilized. One surface of the batt is absorbent while the remainder of the batt is water-repellent and the stabilized assemblage may be used as an absorbent bandage, sanitary napkin or the like.

Having now described the invention in specific detail it will be readily apparent to those skilled in the art that innumerable variations, applications, modifications and extensions of the basic principles involved may be made without departing from its spirit and scope. The invention therefore is intended to be limited only in accordance with the appended patent claims.

What is claimed is:

1. A method of making a handleable, absorbent assemblage of fibrous material from a fluffy batt of randomly arranged, mechanically interengaged fibers, which fluffy batt is flimsy and incapable of being handled without fiber separation in the absence of a binder comprising: applying a measured amount of less than ten percent by weight of the assemblage of a foamed bonding material comprising a gas and a liquid adhesive binder to the entire surface of the batt, substantially immediately confining the entire surface of the batt to simultaneously press said foamed bonding material into the entire surface of the batt but not to the intermediate portion thereof, and drying the bonding material while it is on the surface of the batt as aforesaid, thereby forming the said assemblage.

2. A method of making a handleable, absorbent assemblage of fibrous material from a fluffy batt of randomly arranged, mechanically interengaged fibers, which fluffy batt is flimsy and incapable of being handled without fiber separation in the absence of a binder comprising: applying measured amounts of less than ten percent by weight of the assemblage of foamed bonding material comprising a gas and a liquid adhesive binder to opposite surfaces of the batt, applying measured amounts of less than ten percent by weight of the assemblage of foamed bonding material comprising a gas and a liquid adhesive binder to the longitudinal edges of the batt, substantially simultaneously compressing longitudinal edge portions of said batt and confining said opposite surfaces whereby said longitudinal edge portions are densified and stabilized and the bonding material is applied to the opposite surfaces of the batt but not to the intermediate portion thereof, and drying the bonding material while it is on the surfaces of the batt and along its longitudinal edges as aforesaid, thereby forming said assemblage.

3. A method of making a handleable, absorbent assemblage of fibrous material from a fluffy batt of randomly arranged, mechanically interengaged fibers, which fluffy batt is flimsy and incapable of being handled without fiber separation in the absence of a binder comprising: simultaneously applying measured amounts of less than ten percent by weight of the assemblage of foamed bonding material comprising a gas and a liquid adhesive binder to opposite surfaces of the batt and to the longitudinal edges of the batt, simultaneously compressing longitudinal edge portions of said batt and confining said opposite surfaces whereby said longitudinal edge portions are densified and stabilized and the bonding material is applied to the opposite surfaces of the batt but not to the intermediate portion thereof, and drying the bonding material while it is on the surfaces of the batt and along its longitudinal edges as aforesaid, thereby forming said assemblage.

4. A method of making a handleable, absorbent assemblage of fibrous material from a fluffy batt of randomly arranged, mechanically interengaged fibers, which fluffy batt is flimsy and incapable of being handled without fiber separation in the absence of a binder comprising: applying a measured amount of less than ten percent by weight of the assemblage of foamed bonding material comprising a gas and a liquid adhesive binder to one surface of the batt, applying measured amounts of less than ten percent by weight of the assemblage of foamed bonding material comprising a gas and a liquid adhesive binder containing a water-repellent material to the opposite surface of the batt and to longitudinal edge portions of the batt, substantially simultaneously compressing said longitudinal edge portions and confining said opposite surfaces whereby said longitudinal edge portions are densified and stabilized and the bonding material is applied to the opposite surfaces of the batt but not to the intermediate portion thereof, and drying the bonding material while it is on the surfaces of the batt and longitudinal edge portions as aforesaid, thereby forming said assemblage.

5. A method of making a handleable, absorbent assemblage of fibrous material from a fluffy batt of randomly arranged mechanically interengaged fibers, which fluffy batt is flimsy and incapable of being handled without fiber separation in the absence of a binder comprising: simultaneously applying a measured amount of less than ten percent by weight of the assemblage of foamed bonding material comprising a gas and a liquid adhesive binder to one surface of the batt and a measured amount of less than ten percent by weight of the assemblage of foamed bonding material comprising a gas and a liquid adhesive binder containing a water repellent material to the opposite surface of the batt and to longitudinal edge portions of the batt, substantially simultaneously compressing said longitudinal edge portions and confining said opposite surfaces whereby said longitudinal edge portions are densified and stabilized and the bonding material is applied to the opposite surfaces of the batt but not to the intermediate portion thereof, and drying the bonding material while it is on the surfaces of the batt and the longitudinal edge portions as aforesaid, thereby forming said assemblage.

6. A method of making a handleable, absorbent assemblage of fibrous material from a fluffy batt of randomly arranged, mechanically interengaged fibers, which fluffy batt is flimsy and incapable of being handled without fiber separation in the absence of a binder comprising: applying measured amounts of less than ten percent by weight of the assemblage of foamed bonding material comprising a gas and a liquid adhesive binder to the entire surface of the batt, moving the batt with the bonding material thereon through an opening formed by a plurality of moving surfaces positioned with respect to each other to form a rectangular opening, said surfaces moving in the same direction and at the same speed as the batt and contacting the entire surface of the batt, thereby causing the foamed bonding material to be appplied to the entire surface of the moving batt but not to the intermediate portion thereof, and drying the bonding material while it is on the surface of the batt as aforesaid, thereby forming the said assemblage.

7. A method of making a handleable, absorbent assemblage of fibrous material from a fluffy batt of randomly arranged, mechanically interengaged fibers, which fluffy batt is flimsy and incapable of being handled without fiber separation in the absence of a binder comprising: applying a measured amount of less than ten percent by weight of the assemblage of a foamed bonding material comprising a gas and a liquid adhesive binder to one surface of the batt, applying a measured amount of less than ten percent by weight of the assemblage of foamed bonding material comprising a gas and a liquid adhesive binder containing a water repellent material to the opposite surface of the batt and to longitudinal edge portions of the batt, moving the batt with the bonding material thereon through an opening formed by a plurality of moving surfaces positioned with respect to each other to form a rectangular opening, said surfaces moving in the same direction and at the same speed as the batt and contacting the opposite surfaces and longitudinal edges of the batt, thereby causing the bonding material to be applied to the entire surface of the moving batt but not to the intermediate portion thereof, and drying the bonding material while it is on the surface of the batt as aforesaid, thereby forming the said assemblage.

8. A method of making a handleable, absorbent assemblage of fibrous material from a fluffy batt of randomly arranged, mechanically interengaged fibers, which fluffy batt is flimsy and incapable of being handled without fiber separation in the absence of a binder comprising: moving the batt through an opening formed by a plurality of moving surfaces positioned with respect to each other to form a rectangular opening, said surfaces moving in the same direction and at the same speed as the batt and contacting the entire surface of the batt, applying measured amounts of less than ten percent by weight of the assemblage of foamed bonding material comprising a gas and a liquid adhesive binder to the nip formed by said plurality of moving surfaces and said batt, thereby causing the foamed bonding material to be applied to the entire surface of the moving batt but not to the intermediate portion thereof, and drying the bonding material while it is on the surface of the batt as aforesaid, thereby forming said assemblage.

9. Apparatus for producing a handleable, absorbent assemblage of fibrous material from a fluffy batt of randomly arranged, mechanically interengaged fibers, which fluffy batt is flimsy and incapable of being handled without fiber separation in the absence of a binder comprising: a device for applying a coating to the lateral surfaces of an elongated fibrous batt of substantially rectangular cross-section, which comprises a pair of rotatable rolls having parallel axes disposed in a given plane and spaced apart to accommodate the batt and whose cylindrical surfaces are adapted to engage one pair of opposed surfaces of the batt, another pair of rotatable rolls having parallel axes disposed in said given plane and spaced apart to accommodate the batt and to engage the other pair of its opposed surfaces, the cylindrical surfaces of one of said pairs of rolls being of a width to enable said rolls upon rotation to pass between the surfaces of the other pair of rolls and substantially to span the distance between the cylindrical surfaces of said other pair of rolls so as to form an opening in said given plane defined by the cylindrical surfaces of the rolls thereof, and means for rotating all of said rolls in a direction such that the surfaces thereof at the opening are moving in the same direction whereby a batt whose surfaces are engaged by the rolls is advanced through said opening, means for feeding foamed bonding material comprising a gas and a liquid adhesive binder to the lateral surfaces of said fibrous batt while said batt is advancing through said opening whereby bonding material is applied to the entire surface of the moving batt but not to the intermediate portion thereof.

10. Apparatus for producing a handleable, absorbent assemblage of fibrous material from a fluffy batt of randomly arranged, mechanically interengaged fibers, which fluffy batt is flimsy and incapable of being handled without fiber separation in the absence of a binder comprising: a device for applying a coating to the lateral surfaces of an elongated fibrous batt of substantially rectangular cross-section, which comprises a pair of rotatable rolls having parallel axes disposed in a given plane and spaced apart to accommodate the batt and whose cylindrical surfaces are adapted to engage one pair of opposed surfaces of the batt, another pair of rotatable rolls having parallel axes disposed in said given plane and spaced apart to accommodate the batt and to engage the other pair of its opposed surfaces, the cylindrical surfaces of one of said pairs of rolls being of a width to enable said rolls upon rotation to pass between the surfaces of the other pair of rolls and substantially to span the distance between the cylindrical surfaces of said other pair of rolls so as to form an opening in said given plane defined by the cylindrical surfaces of the rolls thereof, means for rotating all of said rolls in a direction such that the surfaces thereof at the opening are moving in the same direction whereby a batt whose surfaces are engaged by the rolls is advanced through said opening, and means for feeding foamed bonding material comprising a gas and a liquid adhesive binder to one lateral surface of said fibrous batt and means for feeding foamed bonding material comprising a gas and a liquid adhesive binder containing a water repellent material to the remaining lateral surfaces of said fibrous batt, while said batt is advancing through said opening whereby bonding material is applied to the entire surface of the moving batt but not to the intermediate portion thereof.

11. Apparatus for producing a handleable, absorbent assemblage of fibrous material from a fluffy batt of randomly arranged, mechanically interengaged fibers, which fluffy batt is flimsy and incapable of being handled without fiber separation in the absence of a binder comprising: a device for applying a coating to the lateral surfaces of an elongated fibrous batt of substantially rectangular cross-section, which comprises a pair of rotatable rolls having parallel axes disposed in a given plane and spaced apart to accommodate the batt and whose cylindrical surfaces are adapted to engage one pair of opposed surfaces of the batt, another pair of rotatable rolls having parallel axes disposed in said given plane and spaced apart to accommodate the batt and to engage the other pair of its opposed surfaces, the cylindrical surfaces of one said pairs of rolls being of a width to enable said rolls upon rotation to pass between the surfaces of the other pair of rolls and substantially to span the distance between the cylindrical surfaces of said other pair of rolls so as to form an opening in said given plane defined by the cylindrical surfaces of the rolls thereof, and means for rotating all of said rolls in a direction such that the surfaces thereof at the opening are moving in the same direction whereby a batt whose surfaces are engaged by the rolls is advanced through said opening, at least one pair of rotatable rolls having raised ridges about the circumference of said rolls, said ridges being positioned to contact said batt adjacent the longitudinal edges thereof whereby the batt is compressed and densified along its longitudinal edges, means for feeding foamed bonding material comprising a gas and a liquid adhesive binder to the lateral surfaces of said fibrous batt while said batt is advancing through said opening whereby bonding material is applied to the entire surface of the moving batt but not to the intermediate portion thereof, and foamed bonding material is uniformly applied to said compressed and densified longitudinal edges of said batt.

12. Apparatus for producing a handleable, absorbent assemblage of fibrous material from a fluffy batt of randomly arranged, mechanically interengaged fibers, which fluffy batt is flimsy and incapable of being handled without fiber separation in the absence of a binder comprising: a device for applying a coating to the lateral surfaces of an elongated fibrous batt of substantially rectangular cross-section, which comprises a pair of rotatable rolls having parallel axes disposed in a given plane and spaced apart to accommodate the batt and whose cylindrical surfaces are adapted to engage one pair of opposed surfaces of the batt, another pair of rotatable rolls having parallel axes disposed in said given plane and spaced apart to accommodate the batt and to engage the other pair of its opposed surfaces, the cylindrical surfaces of one said pairs of rolls being of a width to enable said rolls upon rotation to pass between the surfaces of the other pair of rolls and substantially to span the distance between the cylindrical surfaces of said other pair of rolls so as to form an opening in said given plane defined by the cylindrical surfaces of the rolls thereof, and means for rotating all of said rolls in a direction such that the surfaces thereof at the opening are moving in the same direction whereby a batt whose surfaces are engaged by the rolls is advanced through said opening, at least one pair of rotatable rolls having raised ridges about the circumference of said rolls, said ridges being positioned to contact said batt adjacent the longitudinal edges thereof whereby the batt is compressed and densified along its longitudinal edges, means for feeding foamed bonding material comprising a gas and a liquid adhesive binder to one lateral surface of said fibrous batt and means of feeding foamed bonding material comprising a gas and a liquid adhesive binder containing a water repellent material to the opposite surface and the longitudinal edges of said batt, while said batt is advancing through said opening whereby bonding material is applied to the entire surface of the moving batt but not to the intermediate portion thereof, and foamed bonding material is uniformly applied to said compressed and densified longitudinal edges of said batt.

References Cited
UNITED STATES PATENTS

| | | | |
|---|---|---|---|
| 2,787,271 | 4/1957 | Clark | 128—290 |
| 2,879,197 | 3/1959 | Muskat et al. | 264—45 X |
| 2,952,260 | 9/1960 | Burgeni | 128—290 |
| 2,964,039 | 12/1960 | Johnson et al. | 128—290 |
| 2,972,554 | 2/1961 | Muskat et al. | 264—47 X |
| 3,050,427 | 8/1962 | Slayter et al. | 156—78 X |
| 3,017,304 | 1/1962 | Burgeni | 264—112 X |
| 3,210,240 | 10/1965 | Read et al. | 162—175 |

FOREIGN PATENTS 882,296 11/1961 Great Britain.

JAMES A. SEIDLECK, *Primary Examiner.*

P. ANDERSON, *Assistant Examiner.*